United States Patent [19]

Koenig

[11] Patent Number: 4,735,102
[45] Date of Patent: * Apr. 5, 1988

[54] WEB TENSION TRANSDUCER APPARATUS

[75] Inventor: Robert G. Koenig, Hudson, Ohio

[73] Assignee: Cleveland Machine Controls, Inc., Cleveland, Ohio

[*] Notice: The portion of the term of this patent subsequent to Jun. 23, 2004 has been disclaimed.

[21] Appl. No.: 44,657

[22] Filed: May 1, 1987

Related U.S. Application Data

[63] Continuation of Ser. No. 837,310, Mar. 7, 1986, Pat. No. 4,674,341.

[51] Int. Cl.⁴ ............................................. G01L 5/10
[52] U.S. Cl. ............................................. 73/862.48
[58] Field of Search ........... 73/862.07, 862.48, 862.54, 73/862.55, 862.65

[56] References Cited

U.S. PATENT DOCUMENTS

| | | |
|---|---|---|
| Re. 31,312 | 7/1983 | Eddens . |
| 3,260,106 | 7/1966 | Hull et al. . |
| 3,763,701 | 10/1973 | Wright et al. . |
| 4,052,891 | 10/1977 | Bartlett et al. . |
| 4,326,424 | 4/1982 | Koenig . |
| 4,674,341 | 6/1987 | Koenig ........................ 73/862.48 |

FOREIGN PATENT DOCUMENTS

| | | |
|---|---|---|
| 2452925 | 5/1976 | Fed. Rep. of Germany ... 73/862.48 |
| 2520672 | 11/1976 | Fed. Rep. of Germany ... 73/862.65 |

*Primary Examiner*—Charles A. Ruehl
*Attorney, Agent, or Firm*—Body, Vickers & Daniels

[57] ABSTRACT

An easily installed and disassembled web transducer device for measuring and monitoring the tension in a continuously moving web as it moves over a tensioning roller. The transducer device comprises a cantilever mounted strain beam with attached strain gauges at the beam flex points and formed at its free end with a cup-shaped coupling receptacle having an open outer end enclosing and supporting one end of a support shaft for the web tensioning roller by a self-aligning bearing retained in place in the bore of the coupling receptable by a retaining ring snap locked in an annular groove in the receptacle bore. A spring washer in the coupling receptacle bore is biased between the closed inner end thereof and the bearing to continuously yieldingly urge the latter toward axially abutting engagement with the retainer ring.

17 Claims, 3 Drawing Sheets

WEB TENSION TRANSDUCER APPARATUS

This is a continuation of application Ser. No. 837,310 filed Mar. 7, 1986, U.S. Pat. No. 4,674,341.

This invention relates in general to monitoring apparatus for measuring and indicating the tension in a continuously moving web and, more particularly, to apparatus for sensing the tension in rapidly moving webs and producing a signal proportional to such tension.

PRIOR ART

This invention in many ways relates to improvements in the devices described in U.S. Pat. Nos. 3,260,106 Hull et al issued July 12, 1966; 3,763,701 Wright et al, issued Oct. 9, 1973 4,052,891 Bartlett, issued Oct. 11, 1977; 4,326,424 Koenig, issued Apr. 27, 1982; and U.S. Pat. No. Re. 31,312 Eddens, reissued July 19, 1983, and the disclosures of such patents are incorporated herein by reference.

BACKGROUND OF THE INVENTION

As disclosed in the above patents, in web handling processes wherein a web of flexible material such as a fabric, paper, or metal, is continuously passed at high speeds partly around a guide roll either fixed or rotatably supported on a shaft, it is known to support one or both ends of the shaft by a device capable of measuring the transverse or radial forces exerted on the roll by the tensions in the moving web and then making continuing adjustments to the web tension, responsive to the ongoing web tension measurements, either by manual or automatic control equipment. These known web tension measuring devices are customarily comprised of a sensor in the form of a strain beam cantilever mounted on a fixed frame and the flexurable free end of which is coupled to and supports an end of the guide roll shaft through either a thin flexurable steel diaphragm or a pivotal connection such as a self-aligning bearing. Strain gauges attached to the strain beam and connected in an electrical circuit then generate a continuing electrical signal representative of the beam deflection by the web tension forces and thus representative of the instantaneous tension in the moving web.

While the use of a flexurable diaphragm to support the end of the guide roll shaft of such web tension measuring devices is advantageous for a number of reasons such as avoiding the introduction of hysteresis into the measurements of the beam deflection and permitting minor amounts of shaft misalignment and length expansion to occur without seriously affecting the accuracy of such measurements, the diaphragm nevertheless is limited in the amount of tolerance which it has for such variables. In addition, the life of the diaphragm is somewhat limited because of the constant flexing thereof during use which leads to fatigue and failure of the diaphragm in a relatively short period of operating time, thus necessitating the disassembly and reassembly of the apparatus from time to time to enable replacement of the damaged diaphragm. To avoid such difficulties, therefore, web tension measuring devices of the general type referred to above and commonly in use at present generally have been provided with sliding or ball type pivoting connections instead of a flexurable diaphragm for coupling the end of the guide roll shaft to and supporting it on the flexurable end of the cantilever mounted strain beam of the device.

Prior known types of web tension measuring devices employing such sliding or ball type pivotal or self-aligning bearings for connecting the end of the guide roll support shaft to the unsupported free end of the flexurable strain beam have not proven entirely satisfactory for one reason or another, however, for every form of service application. Included among these various reasons for their not being entirely satisfactory in all cases are their susceptibility to unacceptably high hysteresis, the critical and expensive manufacturing procedures involved in their fabrication, the lack of any provision for self-lubrication of the self-aligning bearing to prolong the service life thereof and minimize hysteresis, the limited ability of the ball bearing type shaft supports to accommodate shaft expansion, their involved assembly and disassembly procedures, and the many component parts of which some of these prior known devices are constituted.

SUMMARY OF THE INVENTION

The present invention contemplates a new and improved moving web tension sensor and transducer device which overcomes all of the above referred to problems and others and provides a web tension measuring and monitoring device of comparatively simple and easily fabricated and assembled construction and having relatively low hysteresis within acceptable limits for most service applications and adequate ability to accommodate shaft expansion and/or guide roll misalignment without seriously affecting the accruacy of the web tension measurements.

Briefly stated, in accordance with one aspect of the invention, a strain sensor for the support shaft of the guide roll in a moving web tensioning machine is comprised of a flexurable strain beam type transducer cantilever mounted at one end and extending toward and opposite one end of the guide roll shaft in substantially centrally aligned relation therewith. The strain beam is formed at its free other end adjacent the end of the shaft with a cup-shaped coupling member portion comprised of a transversely extending end plate portion disposed opposite and closely adjacent the shaft end and an annular side wall portion axially aligned with the axis of the support shaft and defining an open end bore facing toward the shaft end with the bore wall concentric with and surrounding the end of the shaft. A self-aligning type ball bearing, preferably having a double row of ball bearings and an outer race with a spherically dished bearing surface, is fitted on the end of the support shaft which is enclosed within the bore opening of the coupling portion of the strain beam means. The bearing is seated against the bore wall of the coupling to thereby support the enclosed shaft end in the coupling portion of the strain beam means and couple it to and support it from the flexurable free end thereof. Strain sensing transducers or gauges connected in an electrical circuit are mounted on the strain beam means at locations thereon to produce a signal derived from the straining of the beam means by the tensioned web and therefore representative of the instantaneous tension forces in the moving web.

In accordance with another aspect of the invention, a retaining ring removably secured in the bore wall of the coupling member portion of the beam means is engageable with the self-aligning bearing positioned in the bore of the coupling portion to retain the bearing in place therein, and a wave shape or other type spring washer is disposed concentrically within the bore opening of the coupling member in interposed biased position between the end plate portion of the coupling member and the outer bearing member of the self-aligning bearing to continuously yieldingly urge the bearing toward axially abutting engagement with the retaining ring.

In accordance with a further aspect of the invention, the self-aligning bearing of the web tension measuring device is isolated within a lubricating grease containing compartment portion of the bore in the coupling member formed by grease seals fitted within the bore on each side of the bearing and engaged with the opposite side faces of the inner bearing or race thereof, and a grease fitting is removably secured in and closes a grease introducing opening extending through the side wall portion of the coupling member and communicating with the bearing containing compartment portion thereof located between the grease seals.

The principal object of the invention is to provide a new and improved web tension measuring device which is of comparatively simple form composed of a minimum number of easily fabricated component parts which are easy to assemble and disassemble, which device has a minimum hysteresis response loop and is accurate and reliable in operation over an extended period of operating time.

Another object of the invention is to provide a web tension measuring device of the above described type which is capable of accommodating normal roller shaft expansion during operation without seriously affecting the accuracy of the web tension measurements.

Still another object of the invention is to provide a web tension measuring device of the above described type which is capable of accommodating appreciable amounts of roller shaft misalignment without seriously affecting the accuracy of the web tension measurements.

A further object of the invention is to provide a web tension measuring device of the above described type which is insensitive to the effects of bending of the guide roll support shaft by the web tension forces applied to the guide roll.

A still further object of the invention is to provide a web tension measuring device of the above described type which is not subject to fatigue caused by overloading or vibration and other forces to which the device is subjected in use.

Yet another object of the invention is to provide a web tension measuring device of the above described type having a self-aligning ball bearing to support the end of the guide roll shaft on the flexurable end of the strain beam means and having self-lubricating means therefor for minimizing the hysteresis normally introduced by such type bearings.

Further objects and advantages of the invention will be apparent from the following detailed description of preferred species thereof and from the accompanying drawings.

DESCRIPTION OF THE PREFERRED EMBODIMENT

Figure 1:
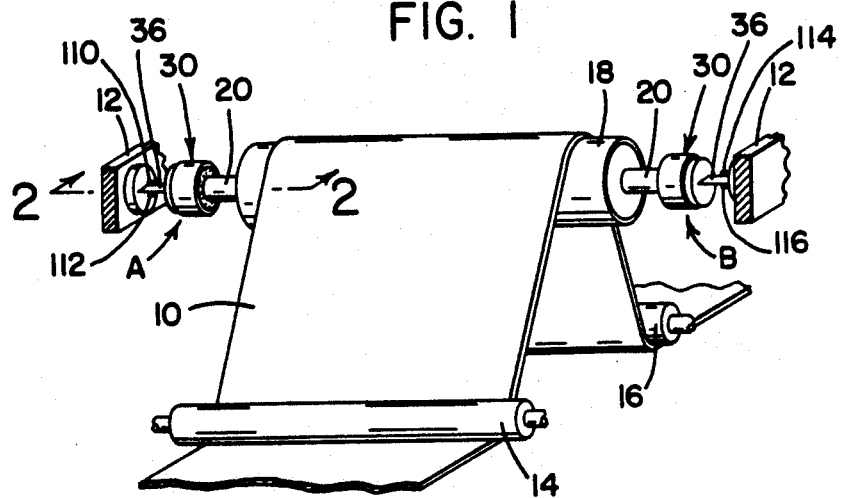
FIG. 1 is a fragmentary perspective view of the general arrangement of a system for monitoring the tension in a moving web.

Referring now to the drawings wherein the showings are for the purposes of illustrating a preferred embodiment of the invention only and not for the purpose of limiting same, FIG. 1 illustrates a web 10 continuously moving lengthwise through a web handling apparatus comprised of a frame 12, a pair of spaced parallel idler rollers 14, 16 extending horizontally, for example, and a web tensioning guide roll or roller 18 extending parallel to and located between but displaced from, e.g., above, the plane of the two idler rollers 14, 16 by an amount such that the web 10, as it moves over the guide roll 18, is displaced from its normal line of movement parallel to the plane of the idler rollers 14, 16 and wraps partly around the guide roll 18. The tension in the web 10 thus exerts a force downwardly against the guide roll 18 which is located somewhere between the two idler rollers 14 and 16, the direction of which force depends upon the angle subtended by the web as it passes over the web tensioning guide roll 18. Thus, where the guide roll 18 is located midway between the two idler rollers 14, 16, the force exerted by the tensioned web against the guide roll 18 is then directed vertically downward thereagainst. The web handling apparatus is conventional and is shown schematically with only those parts thereof pertinent to the present invention being shown.

The guide roll 18 is supported at its opposite ends either in fixed relation on a horizontally extending parallel support shaft 20, as by means of collars 22 fixedly mounted thereon, or it may be rotatably mounted on the support shaft as by means of ball bearings (not shown). Shaft 20 extends transversely between the side frame portions 12 of the apparatus, and the ends of this shaft are supported relative to the side frame portions by means of respective identical force sensing means A, B in a manner in accordance with the present invention.

In the embodiment shown, each of the force sensing means A and B comprises a sensor beam member 30 formed of metal and comprised of base and movable end plate portions 32, 34 which are of essentially corresponding circular contour and are joined together and held in spaced, parallel, coaxial relation by a flat strain beam portion or bridge member 36 of comparatively thin plate-shaped form which extends centrally of and flatwise between the end plate portions 32, 34 in a plane perpendicular thereto and containing the common axis of the circular end plate portions. The strain beam portion 36 of the sensor beam member 30 is fastened to and joined at its opposite ends to the plates 32, 34 by any suitable means such as by welding, or by being formed integral therewith as shown.

The sensor beam member 30 is mounted within the cylindrical hollow interior or open end chamber 38 of a cup-shaped housing 40 as by means of threaded mounting bolts 42 which rigidly fasten the base plate portion 32 of the sensor beam member to the base end wall 44 of the housing. The housing 40 in turn is mounted on the frame 12 of the apparatus, with the open end of its chamber 38 facing toward and enclosing an end of the guide roll support shaft 20, by means of threaded transducer mounting bolts 46 extending through openings in a flange 48 on the housing and screw-threaded into threaded openings in the frame 12. The sensor beam member 30 and attached housing 40 are mounted on the frame 12 by the fastening bolts 46 with the strain beam or bridge portion 36 disposed flatwise in a plane which extends parallel to and approximately including the axis of the guide roll support shaft 20 in the unloaded condition thereof, and which plane is disposed normal to the direction of the forces imposed on the guide roll 18 and its support shaft 20 due to the tension in the moving web 10. Thus, where these web tension forces are to be directed vertically downward against the guide roll 18, as indicated generally by the arrows in FIGS. 3 and 4, the sensor beam member 30 and the housing 40 to which it is fastened are mounted in such case on the frame 12 with the strain beam or bridge portion 36 of the sensor beam disposed flatwise in approximately a horizontal plane. The strain beam or bridge portion 36 of the sensor beam member 30 thus is cantilever mounted at its anchor end on the fixed base plate portion 32 so that its other end is free to bend or deflect downwardly when forces are imposed on the movable plate 34 by the downward forces imposed on the guide roll shaft 20 due to the tension in the web 10. As the downward force on the movable plate 34 increases, the upper surface of the strain beam portion 36 is in a state of increasing tension while the opposite or lower surface is in a state of increasing compression. Conversely, as the downward force on the movable plate 34 decreases, the upper surface of the strain beam portion 36 is in a state of decreasing tension while the lower surface is in a state of decreasing compression.

Figure 2:
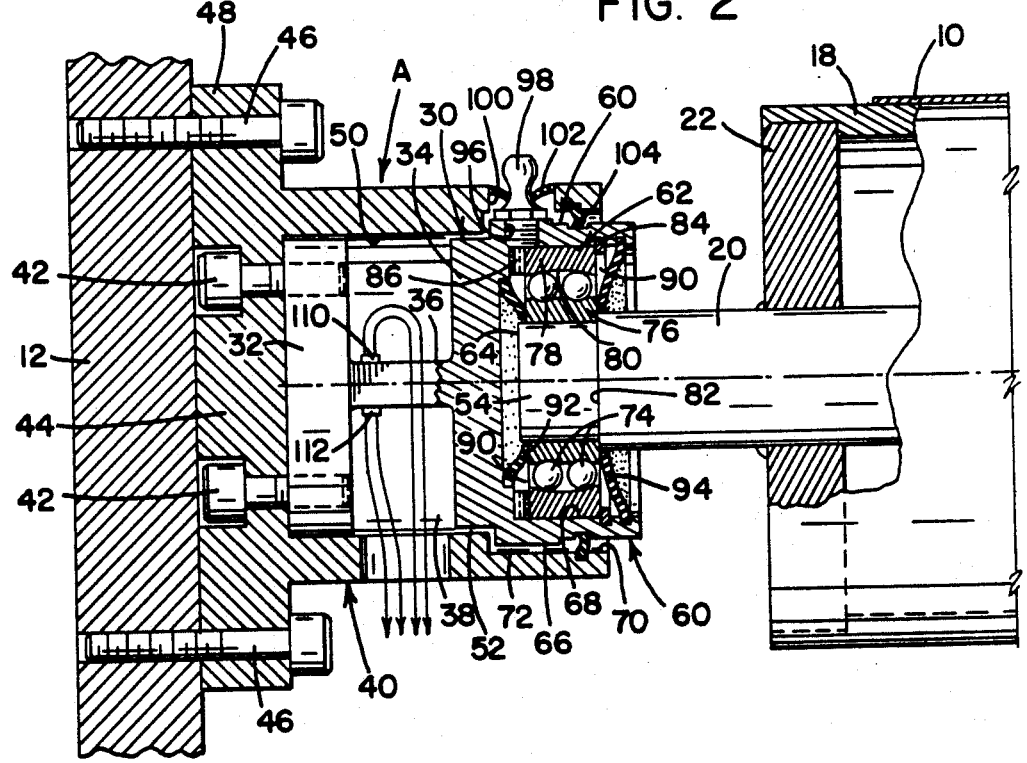
FIG. 2 is an enlarged fragmentary vertical section view of one end of the web tension measuring apparatus comprising the invention taken approximately on the line 2—2 of FIG. 1 and showing in detail a preferred embodiment of a single beam sensor in its normal state with no web tension forces imposed thereon.
Figure 3:
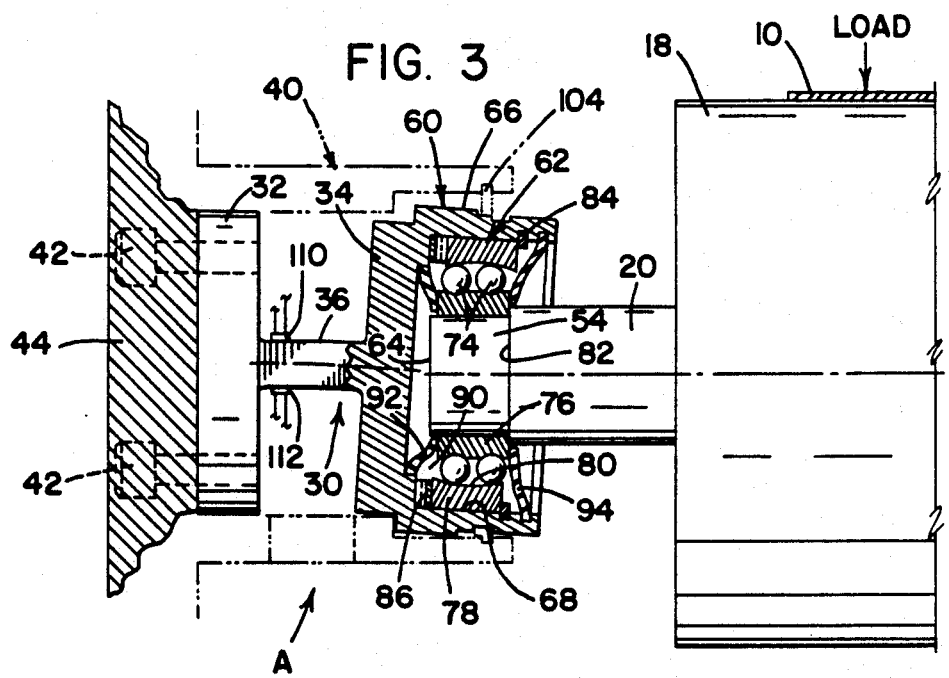
FIG. 3 is a view similar to FIG. 2 but somewhat schematic and showing the sensor under load.

As shown particularly in FIG. 2, the movable end plate portion 34 of the sensor member 30 is of somewhat smaller diameter than the diameter of the cylindrical chamber or bore wall 50 of the housing 40 so as to provide a slight clearance therebetween as indicated at 52 for permitting a limited amount of downward deflection movement of the sensor beam member 36 and end plate portion 34 by the web tension forces applied to the guide roll support shaft 20. The wall 50 of the housing chamber or bore 38 thus serves as a positive mechanical stop during the operation of the apparatus for engaging with the periphery of the movable end plate portion 34 of the sensor beam 30 to prevent excessive downward deflection and resulting overloading of the strain beam portion 36 thereof (FIG. 3).

The end 54 of shaft 20 comprises a stub shaft portion which is enclosed within the chamber 38 of housing 40 and is coupled to and supported in place on the movable end of the sensor member 30 by a novel mounting arrangement according to the invention and comprised of a cup-shaped end coupling 60 formed on the sensor member 30, and a self-aligning bearing 62 fitted within the coupling 60 and surrounding and fitted on the stub shaft end 54 of the shaft 20 to rotatively support the shaft on the sensor member 30 and allow for misalignment of the transducer and/or bending of the roll shaft 20 by the load imposed thereon. The cupshaped coupling 60 is comprised in part of the end plate portion 34 of the sensor member 30, which plate portion 34 extends transversely of the sensor beam portion 36 in closely spaced opposed relation to the end extremity 64 of the shaft 20, and an annular side wall portion 66 extending from the end plate portion 34 in a direction to enclose the stub shaft end 54 and defining a short open end bore 68 concentric with the shaft 20, in the normal unloaded condition thereof, and facing toward the stub shaft end 54. The outer periphery of the annular side wall portion 66 is also spaced a slight distance from the wall of the counterbore 70 in the bore 38 of housing 40, as indicated at 72 in FIG. 2, to permit a limited amount of downward deflection of the sensor beam portion 36 and the associated end coupling 60 before the periphery of end plate portion 34 engages with the bore wall 50 of the housing.

The self-aligning bearing 62 preferably is of the ball bearing type and preferably having, as shown, a double row of ball bearings 74 rotatable between an inner race 76 and an outer race 78 preferably having a bearing surface 80 of spherically dished shape. The inner race 76 of bearing 62 is fitted on the reduced diameter end portion 54 of shaft 20 in axially abutting engagement with the annular step shoulder 82 formed thereon by the reduced diameter stub shaft end portion 54. The outer race 78 of bearing 62 has an axially sliding fit in the bore 68 of the cup-shaped coupling member 60, and it is retained in place therein by a retainer ring 84 removably secured within the wall of the bore 68. The retainer ring 84 is preferably in the form of a snap ring which is snap locked into an annular groove in the wall of the bore 68 for easy removal therefrom to permit easy disassembly of the shaft 20 and bearing 62 from the coupling member 60 should it be necessary for some reason or other to replace the bearing.

A soft acting spring washer 86 preferably of wave-shape type is slidably fitted in the bore 68 of the cup-shaped coupling member 60 and interposed in biased position between the inner or base end wall of the bore 68, against step shoulder means the end plate portion 34 of the coupling member 60, and the axial facing side of the outer race 78 of the self-aligning bearing 62, to constantly yieldingly urge the bearing 62 toward axially abutting engagement with the retainer ring 84. The yieldability of the spring washer 86 permits the bearing 62 to slide in the bore 68 in an axial direction away from the retainer ring 84 to accommodate lengthwise expansion of the guide roll support shaft 20 caused by a temperature rise therein during the operation of the web tension measuring apparatus.

The coupling arrangement supporting the end 54 of the guide roll support shaft 20 on the sensor beam member 30 is provided with self-lubricating means for the self-aligning ball bearing 62 in order to minimize the friction therein and thus the hysteresis in the web tension measurements provided by the apparatus. To this end, the self-aligning bearing 62 is isolated within the hollow interior of the coupling member 60 within a grease containing compartment portion 90 thereof formed between conventional type grease seals 92 and 94 of ring-shaped flexible form which are fitted within the hollow interior or bore 68 of the coupling member 60 on each side of the bearing 62 and engaged with the respective side faces of the inner race 76 thereof to form the grease compartment 90. Lubricating grease is introduced into the grease compartment 90 to fill the same and so lubricate the ball bearings 74 and the bearing surfaces of the bearing races 76, 78 through a threaded opening 96 extending through the annular side wall 66 of the coupling member 60 and communicating with the grease compartment 90. A grease fitting 98 is screw threaded into the threaded opening 96 and closes it off from the outside on completion of the filling of the compartment 90 with lubricating grease through the fitting. The grease fitting 96 is inserted into and secured within the threaded opening 96 through a registering opening 100 in the wall of the housing 40. A ring-shaped dust seal 102 is fitted in dust-tight engagement within the opening 100 and around the grease fitting 96 therein to prevent the ingress of dust and dirt particles or other foreign matter into the hollow interior or chamber 38 of the transducer housing 40. Another ring-shaped dust seal 104 is fitted in dust-tight engagement within the counterbore 70 of the housing 40 and around the annular side wall portion 66 of the coupling member 60 to likewise prevent the ingress of dust and dirt particles or other foreign matter into the hollow interior or chamber 38 of the transducer housing 40.

In the embodiment of the invention shown, the strain beam 36 forms a means for supporting the movable plate 34 relative to the anchored plate 32, and at the same time resilient or flexurable means allowing the plate 34 to tilt inwardly toward the guide roll shaft 20 due to forces imposed on the roll 18 by the tensions in the moving web 10. As shown in FIG. 3, the web 10 imposes a vertical force downwardly in the vertical axial plane of the shaft 20, which force is applied to the plate 34 through the self-aligning bearing 62, and this force then causes the strain beam 36 to bend as cantilever mounted beams generally do, as is shown in exaggerated form in FIG. 3. The forces applied to the sensor member 30 are such as never to exceed the elastic limit of the metal of which the strain beam 36 is made so that it always functions as a perfect cantilever spring and will always bend in exact linear relationship to the forces applied thereto.

Figure 4:
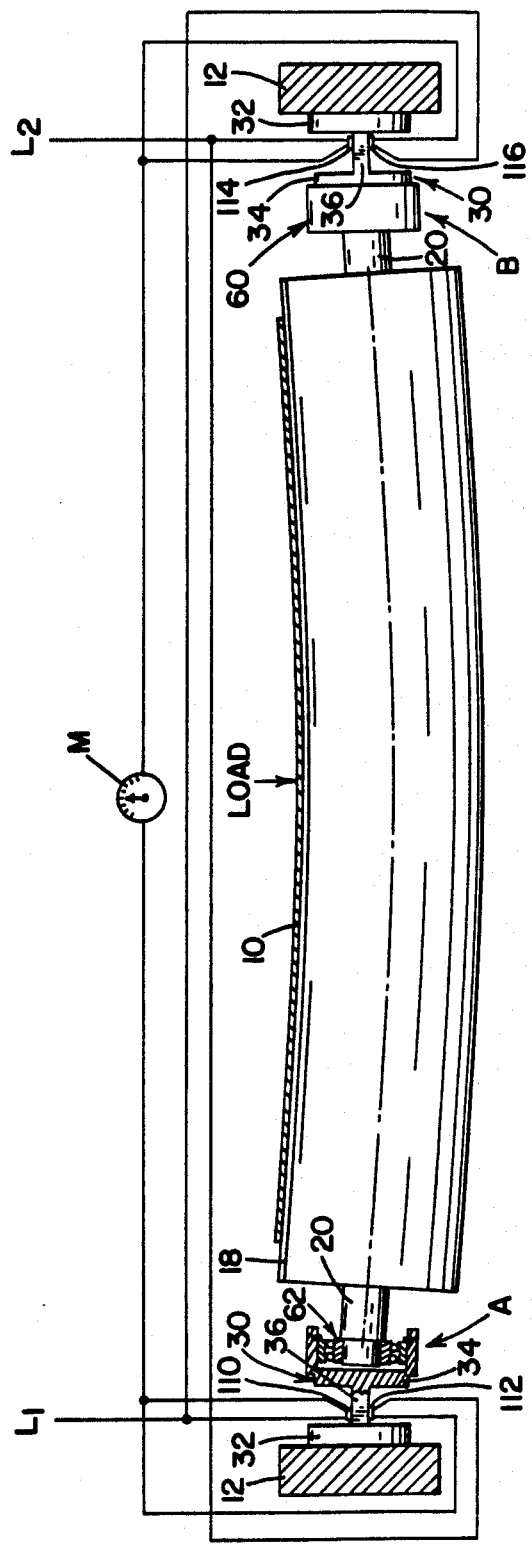
FIG. 4 is a fragmentary schematic view of the entire web supporting roll supported at its ends by sensors and showing in exaggerated form how the web supporting roll bends under transverse web tension forces imposed thereon; and, FIG. 5 is a schematic wiring diagram showing how the strain gauges of FIG. 4 are electrically connected.

It will be appreciated that the shaft 20 on which the guide roll 18 is supported will bend to a slight extent under the web tension forces applied thereto in the manner as is generally shown in FIG. 4. Thus, due to the bending of the shaft, the extended axis of the shaft 20 may no longer be parallel with the axis of the self-aligning bearing 62 mounted on the sensor member 30. This bending of the shaft creates, through the friction of the bearing 62, a force couple on the coupling member 60 tending to further tilt the plate 34 and so further increase the tension in the upper side of the strain beam 36 and the compression in the lower side thereof (or vice versa) as the force couple increases (or decreases) with variations in the web tension. In FIG. 3, the upper surface of the strain beam 36 is in a state of bending tension while the lower surface is in a state of bending compression.

To measure these tensions and compressions in the strain beams 36 supporting the opposite ends of the guide roll support shaft 20, conventional type strain gauges 110, 112 are mounted on the upper and lower surfaces, respectively, of the strain beam 36 of sensor A, adjacent the anchored end of the beam on the base plate 32, this being the point of maximum flexure of the strain beam 36 due to forces exerted thereon by the moving web 10. Thus, as viewed in FIG. 3, strain gauge 110 is in a state of bending tension while strain gauge 112 is in a state of bending compression. The resistance of these gauges always varies in opposite directions. The same will be true in the sensing means B (FIG. 4) at the opposite end of the roll shaft 20 where strain gauges 114, 116 are similarly mounted on the strain beam 36 thereat.

Figure 5:
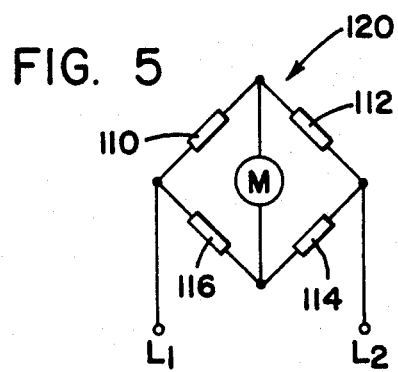

The four strain gauges 110, 112, 114, 116 are connected in a Wheatstone bridge circuit 120, as is shown in FIG. 5, in such a manner that as the resistances of strain gauges 110, 114 increase under bending stress and the resistances of strain gauges 112, 116 decrease under bending stress, an indication will be given on meter M connected between two opposed points of the bridge circuit. This bridge circuit 120 is electrically energized at the diagonally opposed other points thereof from a suitable AC or DC power source through wire leads $L_1$ and $L_2$. Electrical amplifying means (not shown) may be substituted for meter M to provide an electrical signal for controlling servo motors or the like for adjusting the web tension.

The four strain gauges 110, 112, 114, 116 are also affected by the longitudinal tension and/or longitudinal compression forces in the strain beam 36 caused by the friction force couple on plate 34, the same as they would be affected by flexure of the strain beam 36, except that the resistances of the two gauges on each strain beam always vary in the same direction. Because the strain gauges 110, 112, 114, 116, respectively, are on opposite sides of the bridge circuit 120, variations caused by longitudinal tension (or compression) forces due to the force couple are automatically cancelled out and thus have no effect on the output signal of the bridge circuit 120.

The strain gauges may be located at various other corresponding positions on the strain beams 36 supporting the opposite ends of the guide roll support shaft 20. In any event, as long as the strain gauges are suitably connected in a Wheatstone bridge circuit, the effect of longitudinal tension or compression due to the bearing friction force couple is cancelled out, and accurate measurements of the tensions of the web 10 on the roll 18 can readily be obtained and either can be converted into a visual signal or a signal which can be used to further actuate conventional equipment to control the tension in the moving web 10.

Instead of employing a sensor member 30 having only a single strain beam 36 joining the two plates 32, 34 together, the web tension measuring apparatus according to the invention may be provided, if desired, with a twin beam type sensor member such as shown and described in the aforementioned U.S. Pat. No. 4,326,424 and provided with strain gauges in the manner as therein shown. Because of the extremely low and practically nonexistent hysteresis in the electrical response curve of such a modified form of the web tension measuring device according to the invention provided with the above mentioned twin beam type strain beam member, the modified device therefore is particularly suitable for extremely critical web tension measuring applications.

It will thus be evident that a web tension sensing and measuring apparatus is provided by the present invention which is of simple construction comprised of a minimum number of component parts which are easy to fabricate and do not require critical manufacturing operations and which are easy to assemble and disassemble, as for replacement of a failed self-aligning bearing 62. Thus, to disassemble the force sensing means A or B, all that is required after unbolting of the housings 40 thereof from the machine frame 12 is to simply pry the annular grease seal 94 and retainer ring 84 out of their respective retaining grooves in the wall of the bore 68 in the cup-shaped coupling member 60 on the strain beam 36. Thereupon, the assembly of the housing 40 and sensor member 30 may then be simply pulled endwise off the end of and separated from the roll shaft 20 to expose the self-aligning bearing 62 on the shaft for easy replacement thereof.

The web tension measuring device according to the invention, moreover, and particularly in view of the provision therein of self-lubricating means for the self-aligning bearing, is characterized by exceptionally low hysteresis in its electrical response curve such as renders the device eminently suitable for use in most ordinary service applications which do not require extremely critical force measurements, and it provides accurate web tension measurements over an extended period of operating time. In addition, the tension measuring device as disclosed herein is capable of readily accommodating without any adverse affect any normal misalignment of the axis of the guide roll support shaft relative to the common axis of the self-aligning bearing 62 and coupling member 60 such as might occur in the initial assembly and installation of the device or due to the shaft bending under the lateral forces imparted thereto by the web tension. Also, because the outer race 78 of the bearing 62 is axially slidable to a limited extent within the coupling member 60, the device therefore is capable of taking up all normal roll shaft length expansion or contraction due to temperature changes therein or otherwise.

The invention has been described in connection with a preferred embodiment thereof. Obviously, modifications and alterations will occur to others upon a reading and understanding of this specification and it is my intention to include such modifications and alterations insofar as they come within the scope of the appended claims.

Having thus described the invention, it is claimed:

1. In a web tension measuring device for apparatus having a frame and adapted to handle a continuously moving web passing partly around and tensioned by a transversely extending shaft supported at least on one of its ends by said device, said device comprising a housing fixedly mounted on said frame and having a chamber with an open end disposed opposite and facing toward the said one end of the shaft, deflectable strain beam means supported within and cantilever mounted at one end on said housing and extending toward the said one end of said shaft in generally axially aligned relation therewith, said strain beam means being formed at the free other end thereof with an axially extending cup-shaped coupling comprising a flat end plate portion integral with and extending transversely of said beam means in opposed closely spaced relation to the end extremity of the said one end of the shaft and an annular side wall portion extending from said end plate portion toward the said one end of said shaft in generally axially aligned relation therewith and forming a short open end bore concentric with and facing the said one end of the shaft, said coupling enclosing and supporting within the said bore the said one end of said shaft by a self-aligning bearing interposed between and directly engaged with the said one end of said shaft and with the wall of said bore, a stop means removably secured within said coupling and engageable with the said bearing to retain it in place therein, and strain sensing transducing means mounted on said strain beam means at positions for producing a signal derived from the straining of the said beam means by the tensioned web and therefore representative of the tension in the moving web.

2. A web tension measuring device as defined in claim 1, wherein the said bearing comprises a ball bearing type self-aligning bearing.

3. A web tension measuring device as defined in claim 2, wherein the said bearing includes an outer race member with a bearing surface of spherically dished shape.

4. A web tension measuring device as defined in claim 1, wherein the said bearing comprises a two row self-aligning type ball bearing.

5. A web tension measuring device as defined in claim 1, wherein the said stop means comprises a snap ring locked in an annular groove in the wall of said bore.

6. A web tension measuring device as defined in claim 1, wherein the said bearing is axially slidable within said bore for limited sliding movement therein between said stop means and shoulder means on said coupling within the said bore.

7. A web tension measuring device as defined in claim 1, wherein the said shaft is provided with a reduced diameter end portion at the said one end of the shaft and on which the inner bearing member of the said self-aligning bearing is fitted, said reduced diameter portion providing an annular stop shoulder on said shaft against which the said inner bearing member of said bearing is in abutting engagement, and said bearing being slidably fitted in said bore wall for limited sliding movement in said bore between the said stop means and shoulder means on said coupling within the said bore.

8. A web tension measuring device as defined in claim 7, wherein the said shoulder means comprises a step shoulder on the said end plate portion of said coupling.

9. A web tension measuring device as defined in claim 1, wherein an annular grease seal is interposed between and fitted around in dust-tight engagement with the said shaft and the surrounding wall of the said bore at a location in said bore between the said bearing and the said open end of said bore.

10. A web tension measuring transducer for use in an apparatus having a frame and adapted to handle a continuously moving web passing partly around and tensioned by a transversely extending horizontal shaft rotatable about its axis and supported at least on one of its ends by said transducer, said transducer comprising a housing fixedly mounted on said frame and having a chamber with an open end disposed opposite and facing toward the said one end of the said support shaft, a deflectable strain beam supported within and cantilever mounted at one end on said housing and extending toward said open end of said chamber in general axial aligned relationship with said supported shaft, said strain beam having a rectangular cross-section with oppositely facing parallel flat side surfaces disposed generally horizontally, said beam being deflectable in a direction which is generally perpendicular to the said parallel flat side surfaces thereof and being provided at its free end with an integral, shaft end receiving, cylindrical receptacle concentrically surrounding the said one end of the shaft and having an open end disposed opposite and facing toward the said one end of the shaft, said receptacle supporting therein a self-aligning ball bearing having an outer race concentric with said shaft end and in engagement with the wall of said receptacle and an inner race concentric and directly engaged with and fitted on said shaft end and within which the said shaft end is supported, said shaft end and bearing being axially slidable in unison to a limited extent inwardly relative to said receptacle, stop means removably secured within said receptacle adjacent the said open end thereof for engagement with said bearing to retain it in place therein, and strain sensing transducing means mounted on said strain beam means at positions thereon for producing a signal derived from the straining of the said beam means by the tensioned web and therefore representative of the tension in the moving web.

11. In a transducing device for connecting one end of a shaft having a central axis to a support frame, including first support means for fixing the transducer to said frame and movable support means for supporting said one end of said shaft, flexure beam means extending longitudinally of said shaft axis and interconnecting said first support means and said movable support means, strain gauge means mounted on said beam means for creating a signal indicative of flexure of said beam means, said one end of said shaft extending into and being journaled in a selfaligning bearing directly engaging and mounted on said movable support means and including an inner race member and an outer race member, said shaft end and bearing being axially movable in unison to a limited extent relative to and toward the said movable support means, and spring means engaged with one of said race members for biasing said bearing axially of said shaft end.

12. In a transducing device for connecting one end of a shaft having a central axis to a support frame, including first support means for fixing the transducer to said frame and movable support means for supporting said one end of said shaft, flexure beam means extending longitudinally of said shaft axis and interconnecting said first support means and said movable support means, and strain gauge means mounted on said beam means for creating a signal indicative of flexure of said beam means, said one end of said shaft extending into and being journaled in a self-aligning bearing directly engaging and mounted within a receptacle on said movable support means said shaft end and bearing being axially slidable in unison to a limited extend inwardly relative to said receptacle to accommodate normal lengthwise expansion of said shaft during use of said device.

13. In a web tension measuring device for apparatus having a frame and adapted to handle a continuously moving web passing partly around and tensioned by a transversely extending support shaft supported at least on one of its ends by said device, said device comprising a housing fixedly mounted on said frame and having a chamber with an open end disposed opposite and facing toward the said one end of the shaft, deflectable strain beam means supported within and cantilever mounted at one end on said housing and extending toward the said one end of said shaft in generally parallel and axially centered relation therewith and terminating in movable support means for supporting said one end of said shaft and defining a fixed effective beam length for said strain beam means, a stub shaft portion extending from one, and toward the other one, of the said movable support means on said strain beam means and the saids one end of said support shaft, and in generally parallel axially centered relation with said support shaft, an annular coupling portion on the said other one of said strain beam means and said one end of said support shaft and surrounding said stub shaft portion in coaxial relation therewith, a self-aligning bearing interposed between and directly engaged with and supported in place on said stub shaft portion and in said annular coupling portion to permit relative rotation therebetween about the axis of said support shaft, said support shaft and one of said bearing and said coupling portion being axially movable in unison to a limited extent relative to and toward the said movable support means to accommodate normal lengthwise expansion of said shaft during use of said device, and strain sensing transducing means mounted on said strain beam means at positions for producing a signal derived from the straining of the said beam means by the tensioned web and therefore representative of the tension in the moving web.

14. A web measuring device as defined in claim 13, wherein the said axial movement in unison of said support shaft and said bearing is spring biased.

15. A web tension measuring device as defined in claim 13, wherein the said self-aligning bearing is maintained in fixed axial position on said stub shaft portion.

16. A web tension measuring device as defined in claim 13, wherein the said bearing comprises a ball bearing type self-aligning bearing having an inner race and an outer race, said inner race being directly engaged with and maintained in fixed axial position on said stub shaft portion and said outer race being directly engaged with and axially slidable within said annular coupling portion to afford the said limited extent of axial sliding movement therein of said bearing, said axial sliding movement of said outer race being spring biased.

17. A web tension measuring device as defined in claim 13, wherein the said bearing comprises a two row self-aligning bearing.

* * * * *